United States Patent
Muta

(10) Patent No.: US 10,599,322 B2
(45) Date of Patent: Mar. 24, 2020

(54) DISPLAY CONTROL SYSTEM, DISPLAY CONTROL METHOD, AND DISPLAY CONTROL PROGRAM FOR DISPLAYING CONTENT TO USER IN CONSIDERATION OF POSITION RELATIONSHIP WITH USER TERMINAL

(71) Applicant: Rakuten, Inc., Tokyo (JP)

(72) Inventor: Masafumi Muta, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 23 days.

(21) Appl. No.: 15/565,973

(22) PCT Filed: Mar. 8, 2016

(86) PCT No.: PCT/JP2016/057203
§ 371 (c)(1),
(2) Date: Oct. 12, 2017

(87) PCT Pub. No.: WO2017/154114
PCT Pub. Date: Sep. 14, 2017

(65) Prior Publication Data
US 2018/0095631 A1 Apr. 5, 2018

(51) Int. Cl.
*G06F 3/0488* (2013.01)
*G06F 3/041* (2006.01)

(52) U.S. Cl.
CPC .......... *G06F 3/0488* (2013.01); *G06F 3/0416* (2013.01)

(58) Field of Classification Search
CPC ... G06F 3/0488; G06F 3/0416; H04M 1/7253
See application file for complete search history.

(56) References Cited

U.S. PATENT DOCUMENTS

2011/0050720 A1 3/2011 Carter et al.
2011/0285704 A1* 11/2011 Takeda .................. A63F 13/525
345/419

(Continued)

FOREIGN PATENT DOCUMENTS

JP 2009-247763 A 10/2009
JP 2011-54162 A 3/2011

(Continued)

OTHER PUBLICATIONS

International Search Report dated May 31, 2016, issued by the International Searching Authority in application No. PCT/JP2016/057203.

(Continued)

*Primary Examiner* — John T Repsher, III
(74) *Attorney, Agent, or Firm* — Sughrue Mion, PLLC

(57) ABSTRACT

A display control system displays content on a display screen visible to the user, the display screen is located separately from a terminal operated by a user, and the system includes an acquisition means configured to acquire posture information including the orientation and the tilt of the terminal operated by the user, a calculation means configured to calculate a display position of content-related information related to the content based on the posture information and the orientation of the display screen, and a display control means configured to display the content-related information at the display position calculated by the calculation means on the display screen.

14 Claims, 13 Drawing Sheets

(56) References Cited

U.S. PATENT DOCUMENTS

| | | | |
|---|---|---|---|
| 2011/0294433 A1* | 12/2011 | Matsubara | H04M 1/7253 |
| | | | 455/41.3 |
| 2014/0062874 A1* | 3/2014 | Suggs | G06F 3/0325 |
| | | | 345/158 |
| 2014/0089849 A1* | 3/2014 | Choi | G06F 3/017 |
| | | | 715/810 |
| 2014/0143345 A1 | 5/2014 | Jiang et al. | |
| 2017/0038912 A1* | 2/2017 | Nishida | G06F 3/048 |

FOREIGN PATENT DOCUMENTS

| | | |
|---|---|---|
| JP | 2013-80123 A | 5/2013 |
| JP | 2014-103451 A | 6/2014 |
| JP | 2015-60416 A | 3/2015 |
| JP | 2015-138428 A | 7/2015 |
| JP | 2015-141519 A | 8/2015 |

OTHER PUBLICATIONS

International Preliminary Report on Patentability, dated Sep. 20, 2018, PCT/JP2016/057203.

* cited by examiner

DISPLAY CONTROL SYSTEM, DISPLAY CONTROL METHOD, AND DISPLAY CONTROL PROGRAM FOR DISPLAYING CONTENT TO USER IN CONSIDERATION OF POSITION RELATIONSHIP WITH USER TERMINAL

CROSS REFERENCE TO RELATED APPLICATIONS

This application is a National Stage of International Application No. PCT/JP2016/057203 filed Mar. 8, 2016, the contents of all of which are incorporated herein by reference in their entirety.

TECHNICAL FIELD

One aspect of the present invention relates to a display control system, a display control method, and a display control program.

BACKGROUND ART

As a recent trend, display devices are placed in environments where they are visible to users, and content is displayed on the display devices. Such a system that displays content on a display device is called digital signage, for example, and used for display of a plurality of product advertisements and the like. Further, a system that, by use of a mobile device (terminal), enables operation and selection of content on a large-screen display that can be viewed by a plurality of users is known (for example, see Patent Literature 1). Furthermore, a technique that, when displaying additional information related to objects shown in an image taken, displays a plurality of pieces of additional information so that they do not overlap is known (for example, see Patent Literature 2).

CITATION LIST

Patent Literature

PTL1: Japanese Unexamined Patent Application Publication No. 2011-54162
PTL2: Japanese Unexamined Patent Application Publication No. 2015-138428

SUMMARY OF INVENTION

Technical Problem

In related art, however, content or the like that is displayed by a user's operation is displayed at a specified position based on the positional relationship with a display position of a product or the like. In other words, content or the like is displayed without consideration of the positional relationship with a user, the height of a user and the like, and therefore information such as content is not easily visible to the user in some cases.

In view of the foregoing, an object of one aspect of the present invention is to display information to be displayed by a user's operation in a way that is easily visible to the user in a system where users can operate content that is displayed on a display device which is placed to be visible to users.

Solution to Problem

To solve the above problem, a display control system according to one aspect of the present invention is a display control system for displaying content on a display screen visible to the user, the display screen being located separately from a terminal operated by a user, including an acquisition means configured to acquire posture information including an orientation and a tilt of the terminal operated by the user, a calculation means configured to calculate a display position of content-related information related to the content based on the posture information and an orientation of the display screen, and a display control means configured to display the content-related information at the display position calculated by the calculation means on the display screen.

A display control method according to one aspect of the present invention is a display control method in a display control system for displaying content on a display screen visible to the user, the display screen being located separately from a terminal operated by a user, the method including an acquisition step of acquiring posture information including an orientation and a tilt of the terminal operated by the user, a calculation step of calculating a display position of content-related information related to the content based on the posture information and an orientation of the display screen, and a display control step of displaying the content-related information at the display position calculated in the calculation step on the display screen.

A display control program according to one aspect of the present invention is a display control program that causes a computer to function as a display control system for displaying content on a display screen visible to the user, the display screen being located separately from a terminal operated by a user, the program causing the computer to function as an acquisition means configured to acquire posture information including an orientation and a tilt of the terminal operated by the user, a calculation means configured to calculate a display position of content-related information related to the content based on the posture information and an orientation of the display screen, and a display control means configured to display the content-related information at the display position calculated by the calculation means on the display screen.

According to the above aspects, an appropriate display position of content-related information is calculated based on the orientation and the tilt of a terminal that is operated by a user and the orientation of a display screen. It is thereby possible to display the content-related information at a position that is easily visible to the user.

In a display control system according to another aspect, the calculation means may calculate a display position including an offset from a specified reference position based on the posture information and the orientation of the display screen.

According to the above aspect, because the display position is a position that is offset from a specified reference position, it is possible to display content at a position that is easily visible to the user.

In a display control system according to another aspect, the display position may be a position that is closer to a position of the terminal than the reference position is.

According to the above aspect, because the display position is a position that is offset from a specified reference position, content-related information is displayed at a position that is closer to the terminal than the reference position is. Accordingly, the content-related information is displayed at a position that is closer to the user than the reference position is. It is thereby possible to display the content-related information at a position that is easily visible to the user.

In a display control system according to another aspect, the calculation means may calculate the display position without using position information of the terminal.

According to the above aspect, there is no need for acquisition of position information by the terminal, transmission of position information from the terminal to the display control system, and calculation based on position information. It is thereby possible to reduce the processing load on the terminal and the display control system.

A display control system according to another aspect may further include an indication information acquisition means configured to acquire indication information for indicating a position on the display screen from the terminal, and the calculation means may calculate a display position of content-related information corresponding to a content area selected based on the indication information from one or more content areas previously placed on the display screen, and the display control means may display the content-related information corresponding to the content area selected based on the indication information at the display position calculated by the calculation means.

According to the above aspect, indication information based on an operation in the terminal is acquired, and content-related information corresponding to a content area selected based on the indication information is displayed. It is thereby possible to display the content-related information related to an item shown in the content area.

In a display control system according to another aspect, the reference position may be specified by the indication information.

According to the above aspect, the content-related information is displayed at a position that is offset from the position specified by the indication information.

In a display control system according to another aspect, the reference position may be a position of a cursor controlled by the indication information or a position in the content area indicated by the cursor.

According to the above aspect, the content-related information is displayed at a position of a cursor controlled by the indication information or a position that is offset from a position in the content area indicated by the cursor.

A display control system according to another aspect may further include a setting means configured to set a no-display area where the content-related information is not to be displayed, and the display control means may adjust the display position so as to display the content-related information in an area other than the no-display area.

According to the above aspect, because the content-related information is displayed at a position outside the no-display area, the content-related information is not displayed in a desired area where the content-related information is not to be displayed, which enhances the visibility of the content-related information.

In a display control system according to another aspect, the setting means may sets, as the no-display area, an object area in the display screen that corresponds to an object placed on the display screen.

According to the above aspect, because an object is placed on the display screen, and an area corresponding to this object is set as the no-display area, it is possible to display the content-related information without superimposition on the object.

In a display control system according to another aspect, the setting means may further set, as the no-display area, in addition to the object area, an area in the display screen that is not visible from the position of the terminal due to a thickness of the object perpendicular to the display screen.

According to the above aspect, the content-related information is displayed in an area of the display screen other than the area that is not visible to a user due to the thickness of an object placed on the display screen, and therefore the visibility of the content-related information is improved.

In a display control system according to another aspect, the display control means may adjust the display position of the content-related information so that the content-related information do not overlap on the display screen.

According to the above aspect, in no case one content-related information is superimposed on another content-related information, and the visibility of each content-related information is improved.

In a display control system according to another aspect, the calculation means may calculate the orientation of the display screen based on posture information acquired from a plurality of terminals, and calculate a relative orientation of the terminal with respect to the display screen based on the calculated orientation of the display screen.

According to the above aspect, the orientation of the display screen is calculated based on the posture information of a plurality of terminals, and it is not necessary to set the orientation of the display screen to the system in advance. This saves a user from having to input information about the orientation of the display screen and eliminates the need for a storage means to store input information.

Advantageous Effects of Invention

According to one aspect of the present invention, in a system where users can operate content that is displayed on a display device which is placed to be visible to users, it is possible to display information to be displayed by a user's operation in a way that is easily visible to the user.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
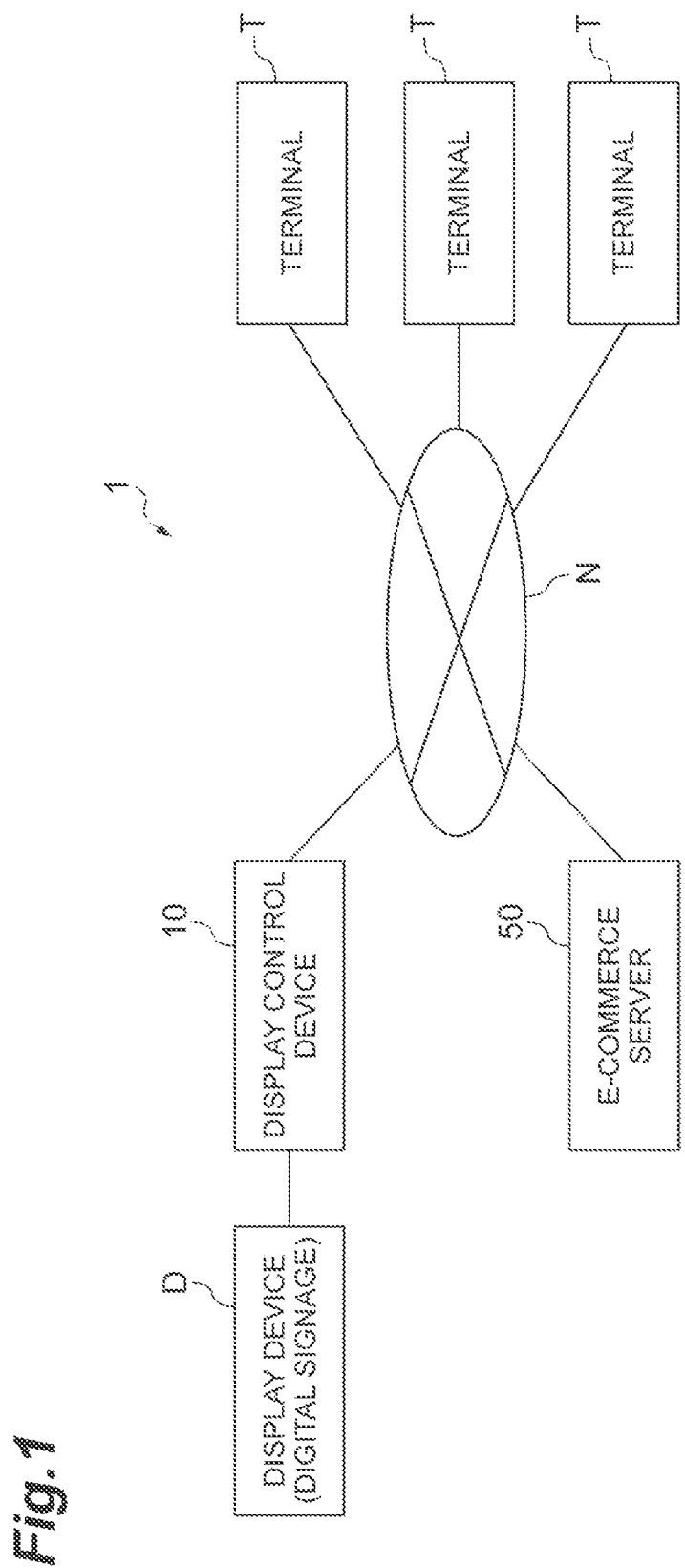
FIG. 1 is a view showing the device configuration of a display control system according to this embodiment.

FIG. 1 is a view showing the device configuration of a display control system according to this embodiment. A display control system 1 according to this embodiment is a system that displays content on a display screen that is visible to a user. As shown in FIG. 1, the display control system 1 includes a display control device 10 and a display device D. The display control device 10 is configured to be able to communicate with an e-commerce server 50 and a plurality of terminals T through a network N. The display control system 1 according to this embodiment displays content on a display screen of the display device D that is located separately from the terminals T used by users.

The display device D constitutes digital signage, for example, and has a display screen that is placed in a location that is visible to users of a plurality of terminals T. The digital signage is to display information such as images and text and provide information to many users. In this embodiment, the digital signage that is implemented using the display device D provides a variety of information to users of the terminals T.

The display control device 10 performs display control of the display device D. To be specific, the display control device 10 can display a variety of content on the display device D. Further, the display control device 10 according to this embodiment has a function as a web server that provides content to a web browser of the terminal T. Specifically, the display control device 10 can receive an indication input to the terminal T and display content on a display of the terminal T. An indication input to the terminal T is an input to a display device which is a touch panel, for example. Note that, although the display control device 10 has a function as a web server in this embodiment, another server that can communicate with the display control device 10 and the terminal T through a network may have a function as a web server.

The e-commerce server 50 is a server that server that runs an e-commerce (electronic commerce) site that provides services such as sales of products, and it has product information, product images and the like for various products. In this embodiment, the e-commerce server 50 provides product information, product images and the like to the display control device 10.

The terminal T is a device owned by a user and, for example, transmits an indication input for content displayed on the digital signage to the display control device 10. The terminal T is an advanced mobile phone (smart phone), for example, though a device that serves as the terminal T is not particularly limited, and it may be a mobile terminal such as a cellular phone or a personal digital assistant (PDA), a stationary or portable personal computer or the like. Although three terminals T are shown in FIG. 1, the number of terminals T is not limited thereto.

Figure 2:
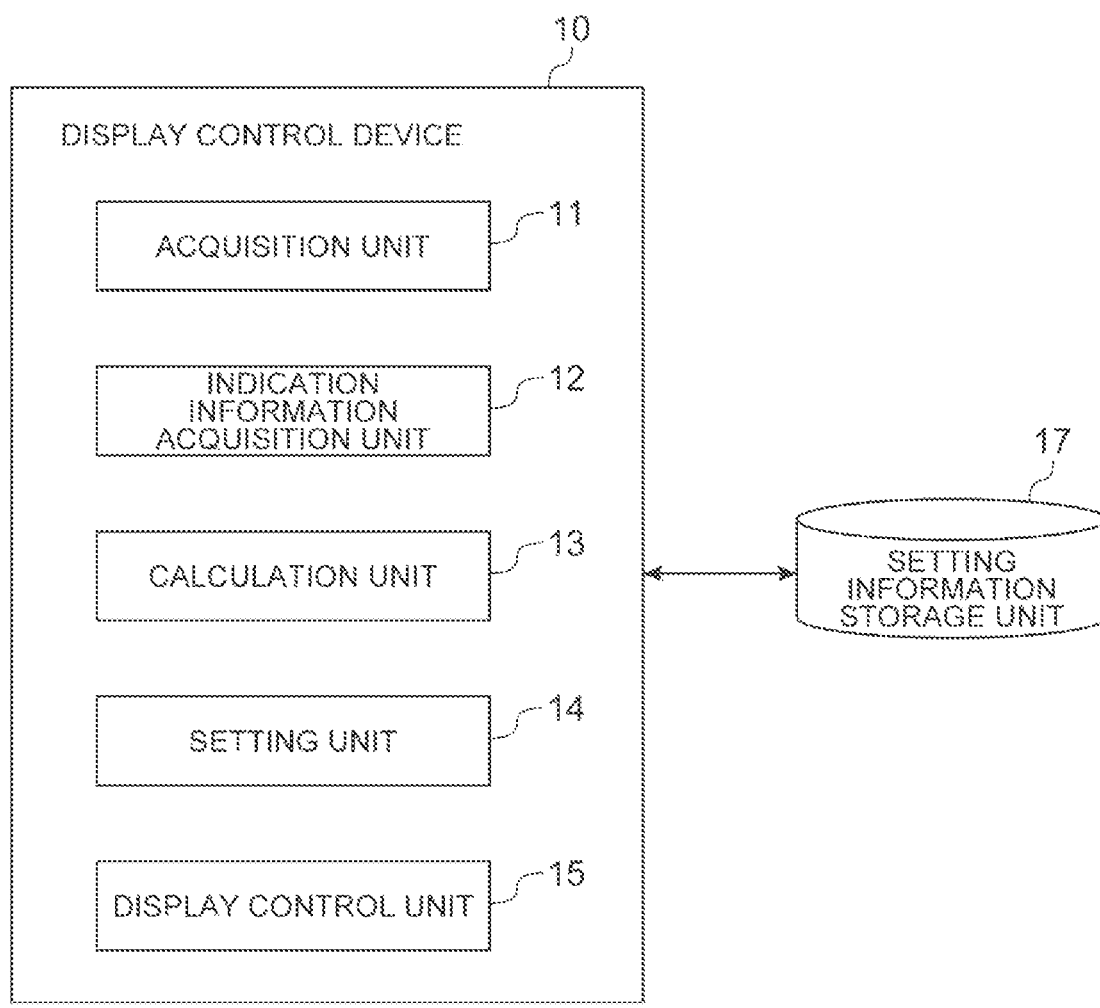
FIG. 2 is a block diagram showing the functional configuration of a display control device.

FIG. 2 is a block diagram showing the functional configuration of the display control device 10. The display control device 10 is a server, for example.

As shown in FIG. 2, the display control device 10 according to this embodiment functionally includes an acquisition unit 11 (acquisition means), an indication information acquisition unit 12 (indication information acquisition means), a calculation unit 13 (calculation means), a setting unit 14 (setting means), and a display control unit 15 (display control means). Each of the functional units of the display control device 10 can access a storage means such as a setting information storage unit 17. The setting information storage unit 17 may be configured to be accessible from the display control device 10 through the network N, or may be placed in the display control device 10.

Figure 3:
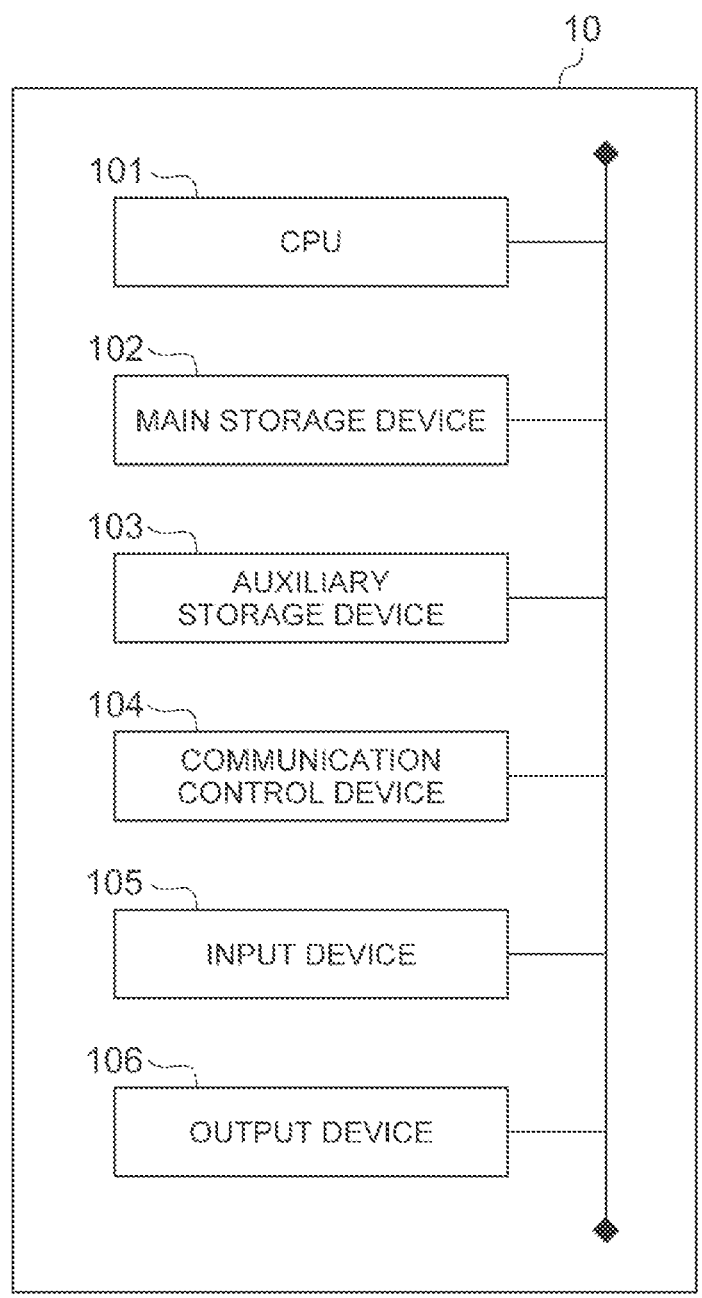
FIG. 3 is a view showing the hardware configuration of the display control device.

FIG. 3 is a view showing the hardware configuration of the display control device 10. As shown in FIG. 3, the display control device 10 is physically configured as a computer system that includes a CPU 101 which is a processor, a main storage device 102 which is memory such as RAM and ROM, an auxiliary storage device 103 such as a hard disk, a communication control device 104 such as a network card, an input device 105 such as a keyboard and a mouse, an output device 106 such as a display and the like.

The functions shown in FIG. 2 are implemented by loading given computer software (display control program) onto hardware such as the CPU 101 or the main storage device 102 shown in FIG. 3, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

The display control system 1 according to this embodiment is schematically described below. In the display control system 1 according to this embodiment, the display control device 10 displays a list of a plurality of products as content on the display device D that constitutes digital signage. To be specific, because the e-commerce server 50 has a variety of product information, product images and the like, the display control unit 15 acquires a plurality of product information and product images from the e-commerce server 50 and displays them on the display device D.

A user who views the display screen that is displayed by the display device D can access the display control device 10 by using the terminal T owned by him/herself and thereby display, on the display screen or on the terminal T, content-related information that is related to a product displayed on the display screen.

Access to the display control device 10 by the terminal T is made by a browser that runs on the terminal T, for example. The browser of the terminal T makes access to the display control device 10. To be specific, the browser of the terminal T accesses a URL that specifies a service such as provision of information related to a product by the display control system according to this embodiment. This URL is provided to the terminal T by various methods. For example, a QR code (registered trademark) indicating a URL is displayed on the display screen of the display device D, and the displayed QR code is read by the terminal T, so that the URL is acquired by the terminal T.

Alternatively, a sound on which information representing a URL is superimposed may be generated in the vicinity of the display device D, so that the URL is acquired by the terminal T. Further, the terminal T may make access to a specified telephone number, and a URL may be provided to the terminal T by a notification means such as SMS (Short Message Service) in response to the access.

Further, a URL may be provided to the terminal T that is located in close proximity to the display device D by near field communication such as Bluetooth (registered trademark). In this case, the terminal T acquires ID that identifies the display control device 10 by near field communication. Based on the acquired ID, the terminal T then refers to the association between ID and URL which is managed in an application for using a service related to the display control system and can thereby acquire the URL.

Note that, although the terminal T makes access to the display control device 10 through a browser application that runs on the browser, it may make access to the display control device 10 through a dedicated application. For example, the terminal T accesses the display control device 10 by a communication method such as Wi-Fi. Further, the terminal T may access the display control device 10 by near field communication such as Bluetooth (registered trademark), and a communication method for access between the terminal T and the display control device 10 is not particularly limited.

Figure 4:
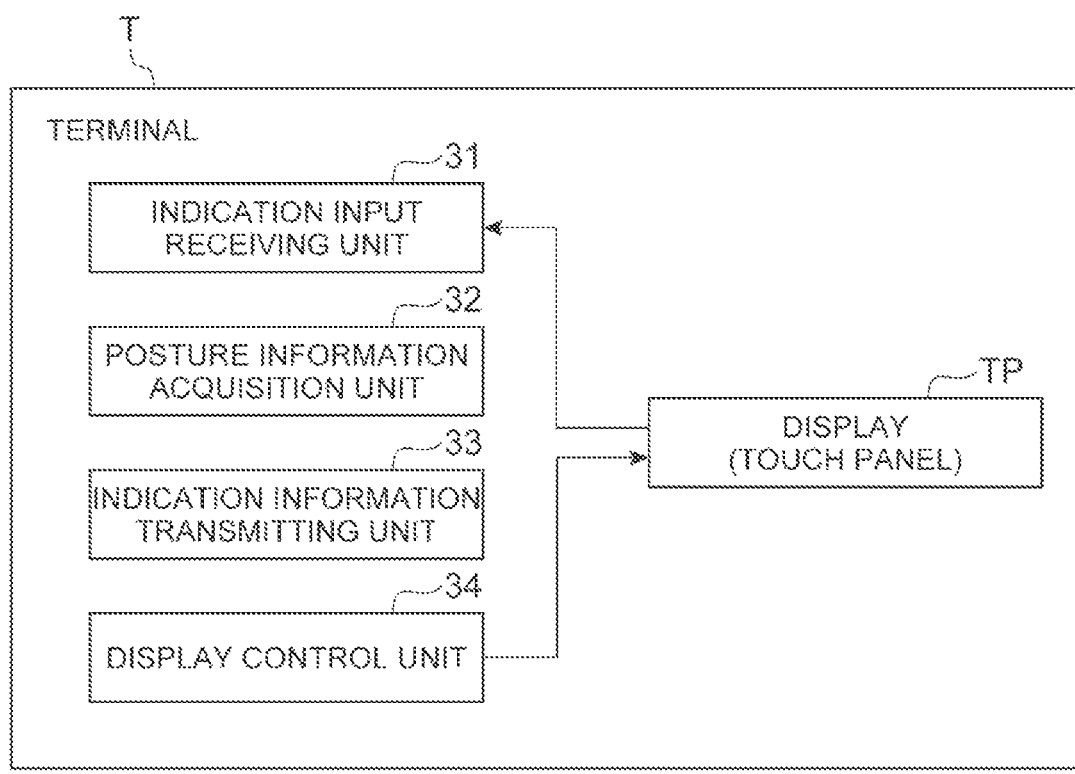
FIG. 4 is a block diagram showing the functional configuration of a terminal.

FIG. 4 is a block diagram showing the functional configuration of the terminal T. The terminal T includes an indication input receiving unit 31, a posture information acquisition unit 32, a transmitting unit 33, a display control unit 34, and a display TP. The display TP is a touch panel, for example.

The indication input receiving unit 31 receives an indication input by a user through the display TP. The indication input receiving unit 31 according to this embodiment receives, as indication information, an input operation on the touch panel for operating a cursor that is displayed on the display screen of the display device D. To be specific, when a user of the terminal T performs an operation on the touch panel, indication information indicating this operation is transmitted to the display control device 10, thereby moving the position of the cursor that is displayed on the display screen of the display device D. Further, the indication input receiving unit 31 receives, as indication information, a selection operation for content such as a product image that is displayed on the display screen of the display device D.

The posture information acquisition unit 32 acquires posture information that includes the orientation and the tilt of the terminal T. To be specific, the orientation of the terminal T is the rotation angle of the terminal T (the yaw angle of the terminal T) with respect to the rotation axis which is the z-axis perpendicular to the horizontal plane, for example, and the northward direction is represented as 0 rad and the southward direction is represented as πrad. Further, the tilt of the terminal T is the rotation angle of the terminal T (the pitch angle of the terminal T) with respect to the rotation axis which is the y-axis parallel to the horizontal plane and along the display plane of the terminal T, for example, and a specific state of the terminal T (for example, the state where the display plane of the display is perpendicular to the horizontal plane) is represented as 0 rad. The orientation and the tilt of the terminal T are detected by sensors such as an electronic compass, an acceleration sensor and a gyro sensor mounted on the terminal T. The posture information acquisition unit 32 acquires the orientation and the tilt of the terminal T from those sensors.

The transmitting unit 33 transmits the indication information related to the indication input that has been received by the indication input receiving unit 31 and the posture information that has been acquired by the posture information acquisition unit 32 to the display control device 10.

The display control unit 34 displays, on the display, a user interface screen for operating a cursor that is displayed on the display screen of the display device D. Further, the display control unit 34 may display, on the display TP, a variety of information provided from the display control device 10, the e-commerce server 50 or the like.

The functional units of the display control device 10 are described hereinafter by referring back to FIG. 2. The acquisition unit 11 acquires the posture information that includes the orientation and the tilt of the terminal T that is operated by a user. As described above, the posture information is acquired by the terminal T, and the acquired posture information is transmitted, and thereby the acquisition unit 11 acquires the posture information that is transmitted from the terminal T.

The indication information acquisition unit 12 acquires, from the terminal T, the indication information for indicating a position on the display screen of the display device D. The indication information is information indicating an input operation on the touch panel for operating a cursor that is displayed on the display screen of the display device D.

The calculation unit 13 calculates a display position of content-related information related to content based on the posture information and the orientation of the display screen. Information about the orientation of the display screen is stored in the display control device 10 or in a storage means that is accessible from the display control device 10. Further, to be specific, the calculation unit 13 calculates a display position containing an offset from a specified reference position related to the display position of the content-related information based on the posture information and the orientation of the display screen. The reference position is a position that is specified by the indication information on the display screen of the display device. The reference position is, for example, the position of a cursor that is indicated by the indication information. Further, the reference position may be the position of a content area that is indicated by a cursor, out of content areas that are set to the display screen. Note that the content area is an area in which each content such as a product image is displayed, or an area in which an object such as an actual product is placed, as described later, on the display screen. The calculation unit 13 calculates a position that is offset from the reference position as the display position based on the posture information and the orientation of the display screen. The calculation of the display position is described in detail later.

The setting unit 14 sets a no-display area on the display screen of the display device D. The no-display area is an area in which the content-related information is not to be displayed. The setting of the no-display area is described in detail later.

The display control unit 15 displays the content-related information at the display position that is calculated by the calculation unit 13. For example, the display control unit 15 displays content such as a product image that has been acquired from the e-commerce server 50 on the display screen. An area where each product image is displayed is set as a content area. Further, an area on the display screen which corresponds to an object placed on the display screen is set as the content area. When the calculation unit 13 calculates the display position of the content-related information which corresponds to the content area that is selected based on the indication information, the display control unit 15 displays the content-related information which corresponds to the content area at the display position that is calculated by the calculation unit 13. The content-related information which corresponds to the content area is information related to an object or a product image that is placed on the display screen, for example.

Figure 5:
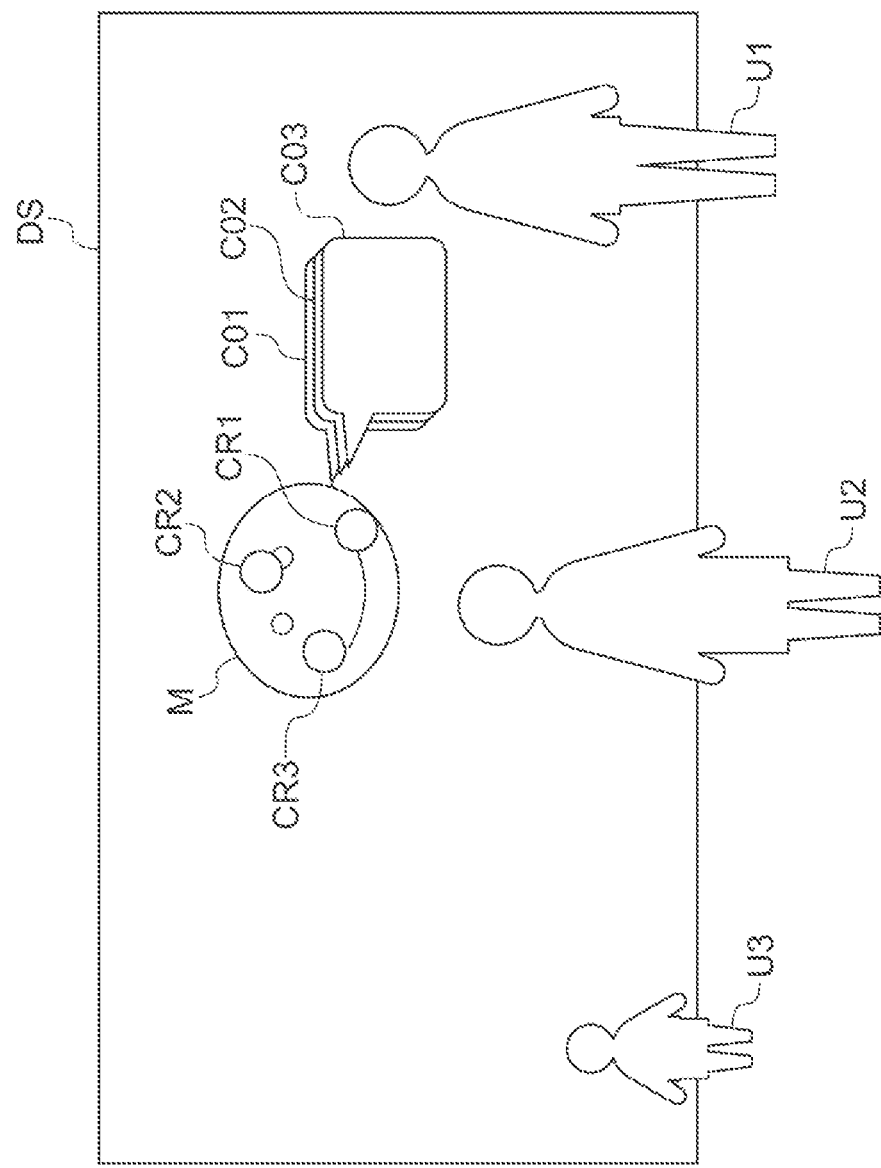
FIG. 5 is a view showing an example of display control of content-related information according to related art.

FIG. 5 is a view showing an example of display control of content-related information according to related art. As shown in FIG. 5, a product image M is displayed on a display screen DS.

When a user U1 operates a terminal owned by him/herself to move a cursor CR1, and the product image M is selected by the cursor CR1, content-related information C01 related to the product image M is displayed. In the system according to related art, the content-related information is displayed on the right of a reference position, which is the position of the product image M, for example.

Further, when users U2 and UR3 operate terminals owned by themselves to move cursors CR2 and CR3, and the product image M is selected by the cursors CR2 and CR3, content-related information C02 and C03 related to the product image M are displayed.

In this manner, in the system according to related art, the content-related information C01, C02 and C03 are displayed at a specified position, which is on the right of the product image M, and therefore they are displayed at the positions with no consideration of the positional relationship with and the height of each of the users U1, U2 and U3. Therefore, each of the users U1, U2 and U3 cannot easily view the content-related information C01, C02 and C03 in some cases.

Figure 6:
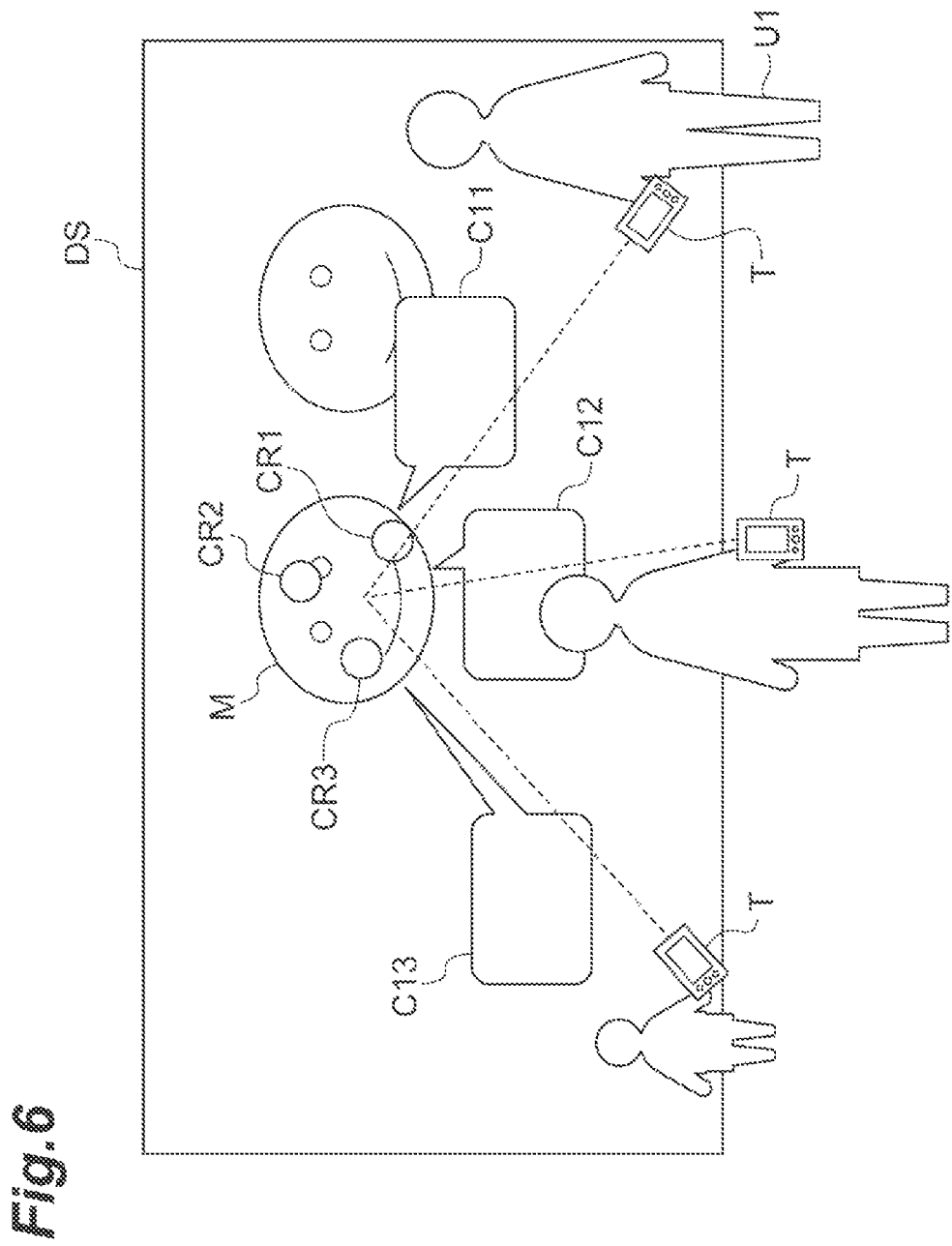
FIG. 6 is a view showing an example of display control of content-related information according to this embodiment.

FIG. 6 is a view showing an example of display control of content-related information according to this embodiment. As shown in FIG. 6, a product image M is displayed on a display screen DS.

When a user U1 operates the terminal T that is owned by him/herself, indication information based on this operation is acquired by the indication information acquisition unit 12. When the cursor CR1 is operated based on the acquired indication information and the product image M is selected by the cursor CR1, the acquisition unit 11 acquires the posture information that includes the orientation and the tilt of the terminal T that is operated by the user U1 from the terminal T. The calculation unit 13 calculates the display position of content-related information C11 related to the product image M based on the posture information and the orientation of the display screen DS.

Figure 7:
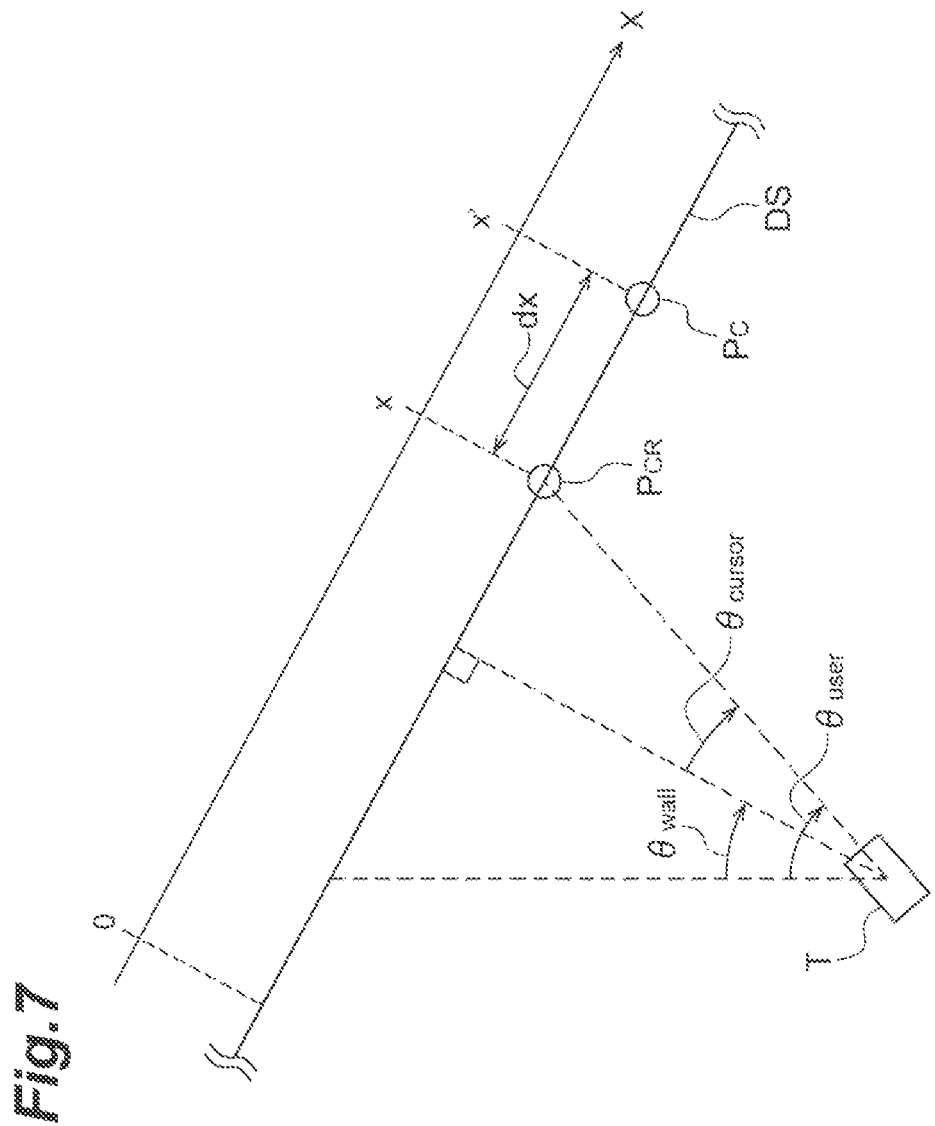
FIG. 7 is a view showing a specific example of calculation of a display position.

FIG. 7 is a view showing a specific example of calculation of a display position. To be specific, FIG. 7 shows an example of calculation of the x-coordinate (x') of the display position, where the horizontal direction of the display screen DS is x-axis, and the vertical direction thereof is the y-axis. As shown in FIG. 7, the position of a cursor on the display screen DS is a position PCR, and a display position to be calculated is a position PC. Further, when the orientation in the backward direction of the display screen DS is an angle $\theta_{wall}$, the orientation of the terminal T is an angle $\theta_{user}$, and the northward direction is represented as 0 rad, an angle $\theta_{cursor}$ indicating the orientation of the terminal T with respect to the orientation of the display screen DS is represented by the following equation (1). Note that the angle $\theta_{wall}$ indicating the orientation in the backward direction of the display screen DS is previously input as a known value to the system, for example.

$$\theta_{cursor} = \theta_{wall} - \theta_{user} \quad (1)$$

Further, when the x-coordinate of the cursor CR is x, the x-coordinate (x') of the display position is represented by the following equation (2).

$$x' = x + dx \quad (2)$$

dx in the equation (2) is an offset of the display position in the x-coordinate with respect to a specified reference position. Specifically, in the example shown in FIG. 7, the position of the cursor CR1 is the specified reference position related to the display position of the content-related information. dx in the equation (2) is represented as the following equation (3) as a function of the orientation of the terminal T with respect to the orientation of the display screen DS.

$$dx = fx(\theta_{cursor}) = fx(\theta_{wall} - \theta_{user}) \quad (3)$$

Various functions can be applied to the function fx that is represented by the equation (3) depending on system design. For example, the function fx may be a function as shown in FIG. 8 and the following equation (4).

$$fx(\theta_{cursor}) = l/2 + Al \sin(\theta_{cursor}) \quad (4)$$

Figure 8:
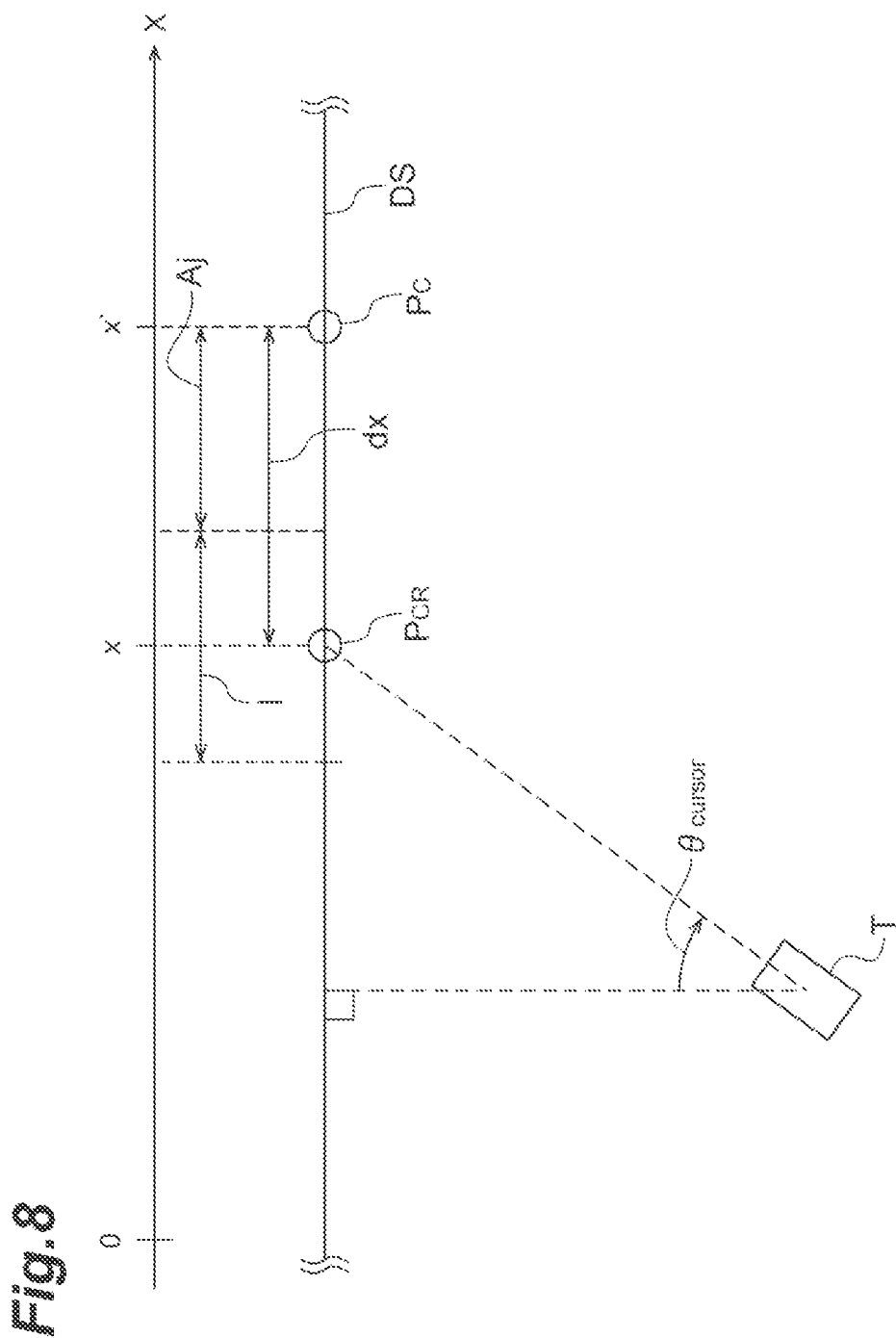
FIG. 8 is a view illustrating a function represented by an equation (4).

FIG. 8 is a view illustrating the function represented by the equation (4). In the equation (4) and FIG. 8, the length l is the width of the product image M along the x-axis, and the coefficient A is a specified coefficient for adjusting the display position of the content-related information. As shown in FIG. 8, when an offset dx is represented as the following equation (5), $$dx = l/2 + A_j \quad (5)$$

a distance Aj from the end of the product image to the display position PC of the content-related information is represented by the following equation (6).

$$A_j = Al \sin(\theta_{cursor}) \quad (6)$$

Specifically, as is known from the equation (6), the x-coordinate of the display position of the content-related information is set somewhere between the end (e.g., the right edge) of the product image M and a position that is distant from that end by the length which is A times the width l of the product image M in accordance with the orientation $\theta_{user}$ of the terminal T in the user. Note that, although the x-coordinate (x') of the display position of the content-related information is shown as a position where the offset dx is added in the positive direction of the x-axis to the x-coordinate (x) of the position of the cursor CR1 in FIG. 8 for convenience of description, when the angle $\theta_{cursor}$ is $3\pi/2 < \theta_{cursor} < 2\pi$, for example, the offset dx is a negative value, and the display position of the content-related information is offset to the left of the cursor position. Further, the coordinates of the display position of the content-related information may be the coordinates of any part of the content, such as the center, the far left, or the far right.

Because the display position is calculated in the above manner, the display position of the content-related information C11 is the position that is offset from the position of the cursor CR1, not the reference position such as "on the right of the product image M" or the position of the cursor CR1, and it is the position closer to the terminal T than the position of the cursor CR1 is. The content-related information C11 is thereby displayed at a position closer to the user U1 than the cursor CR1 or the position of the product image M specified by the cursor CR1. It is thus possible to display the content-related information C11 at a position that is easily visible to the user.

Further, as described earlier, position information indicating the position of the terminal T that is acquired by a GPS device or the like is not needed for calculation of the display position of the content-related information. Accordingly, there is no need for acquisition of position information by the terminal T, transmission of position information from the terminal T to the display control device 10, and calculation based on position information. It is thereby possible to reduce the processing load on the terminal T and the display control device 10. Further, it is possible to display the content-related information at a suitable position regardless of the accuracy of position information acquired by a GPS device.

Note that, in FIGS. 7 and 8, calculation of the x-coordinate of the display position of the content-related information on the display screen DS is described. Specifically, in the example of FIGS. 7 and 8, the orientation of the terminal T (the yaw angle of the terminal T) is $\theta_{user}$, and the value of the x-coordinate is calculated as a function of $\theta_{user}$. On the other hand, the y-coordinate of the display position of the content on the display screen DS can be calculated as a function of the tilt of the terminal T (the pitch angle of the terminal T). Specifically, the y-coordinate of the display position can be calculated as a function of the tilt of the terminal T by replacing the x-axis that is set along the horizontal direction of the display screen DS with the y-axis that is along the vertical direction of the display screen DS and further replacing the orientation of the terminal T (the yaw angle of the terminal T) ($\theta_{user}$) with the tilt of the terminal T (the pitch angle of the terminal T) in the description of FIGS. 7 and 8. Since it is easy, with the ordinary knowledge of those skilled in the art, to replace an example of calculation of the x-coordinate described by reference to FIGS. 7 and 8 with calculation of the y-axis, specific description of calculation of the y-axis is omitted.

It should be noted that, although the angle $\theta_{wall}$ indicating the orientation in the backward direction of the display screen DS is a known value in the above description, the calculation unit 13 may calculate the angle $\theta_{wall}$ indicating the orientation of the display screen based on the posture information acquired from a plurality of terminals T. To be specific, the calculation unit 13 may acquire the angles $\theta_{user}$ indicating the orientations of the terminals T included in the posture information of the plurality of terminals T, and set an average value of the angles $\theta_{user}$ as the angle $\theta_{wall}$. Then, the calculation unit 13 may calculate an angle $\theta_{cursor}$ indicating the relative orientation of each terminal T with respect to the display screen DS based on the calculated angle $\theta_{wall}$ and the angle $\theta_{user}$ indicating the orientation of each terminal T. The orientation of the display screen DS is thereby calculated based on the posture information of the plurality of terminals T, and it is not necessary to set the orientation of the display screen DS to the system in advance. This saves a user from having to input information about the orientation of the display screen DS and eliminates the need for a storage means to store input information.

Setting of a no-display area, which is an area where content-related information is not to be displayed on the display screen DS, and display control in consideration of the no-display area are described hereinafter with reference to FIG. 9. In the display control system 1 according to this embodiment, an object can be placed on the display screen DS. In the example shown in FIG. 9, products B1 and B2, which are books, are placed on the display screen DS. The setting unit 14 sets object areas corresponding to the products B1 and B2 on the display screen DS as no-display areas. Information about the object area may be input by a system administrator or the like, for example. Alternatively, an imaging means that takes an image of the display screen DS may be placed, an object may be extracted from the image of the display screen DS taken by the imaging means, and the object area may be calculated based on the positional relationship between the display screen DS and the imaging means or the like. Information about the object area that has been input or calculated and information about the no-display area that has been set are stored in the setting information storage unit 17.

Figure 9:
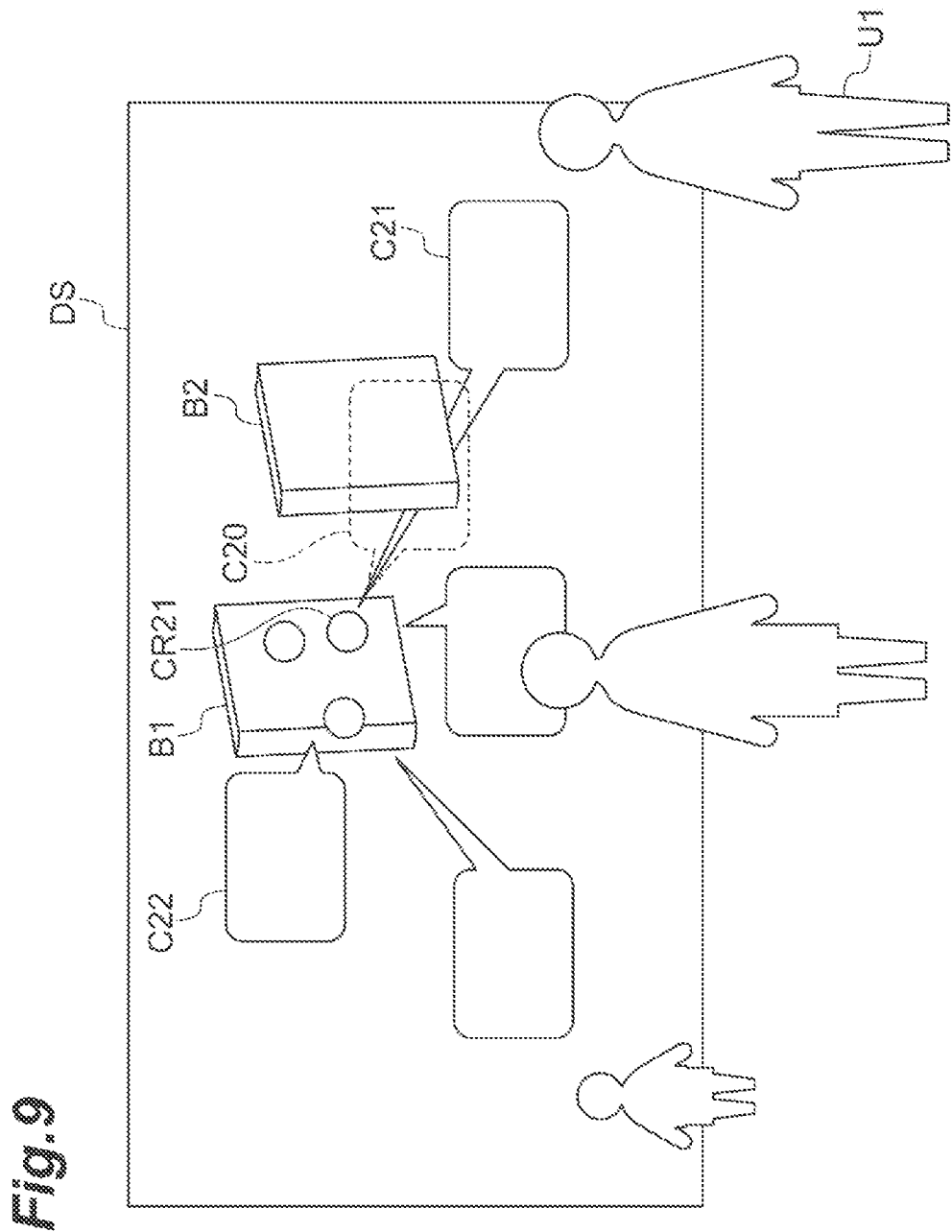
FIG. 9 is a view illustrating setting of a no-display area and display control in consideration of the no-display area.

In FIG. 9, content-related information C20 is shown that is displayed based on the display position calculated by the calculation unit 13 in the case where the no-display area is not set. The display control unit 15 adjusts the display position calculated by the calculation unit 13 so as to display the content-related information in an area other than the no-display area. The display control unit 15 acquires information about the no-display area from the setting information storage unit 17. For example, the display control unit 15 shifts the display position of the content-related information to a position where the content-related information does not overlap the no-display area in the direction of the display position calculated by the calculation unit 13 viewed from the reference position, which is the position of a cursor CR21, as shown in content-related information C21, for example. Further, the display control unit 15 may search for an area which is not the no-display area on the display screen DS and adjust the display position of the content-related information, as shown in content-related information C22.

By adjusting the display position of the content-related information in this manner, the content-related information is displayed at a position outside the no-display area. The content-related information is thereby not displayed in a desired area where the content-related information is not to be displayed, which enhances the visibility of the content-related information. Further, because an object is placed on the display screen, and an area corresponding to this object is set as the no-display area, it is possible to display the content-related information without superimposition on the object.

A setting process that sets, as the no-display area, an area that is not visible to a user due to the thickness of an object placed on the display screen DS is described hereinafter with reference to FIG. 10. In the example shown in FIG. 10, products B1 and B2, which are books, are placed on the display screen DS, and thereby a hidden area H that is not visible to a user U1 occurs due to the thickness of the product B1 that is perpendicular to the display screen DS. The setting unit 14 sets the hidden area H also as the no-display area.

Figure 10:
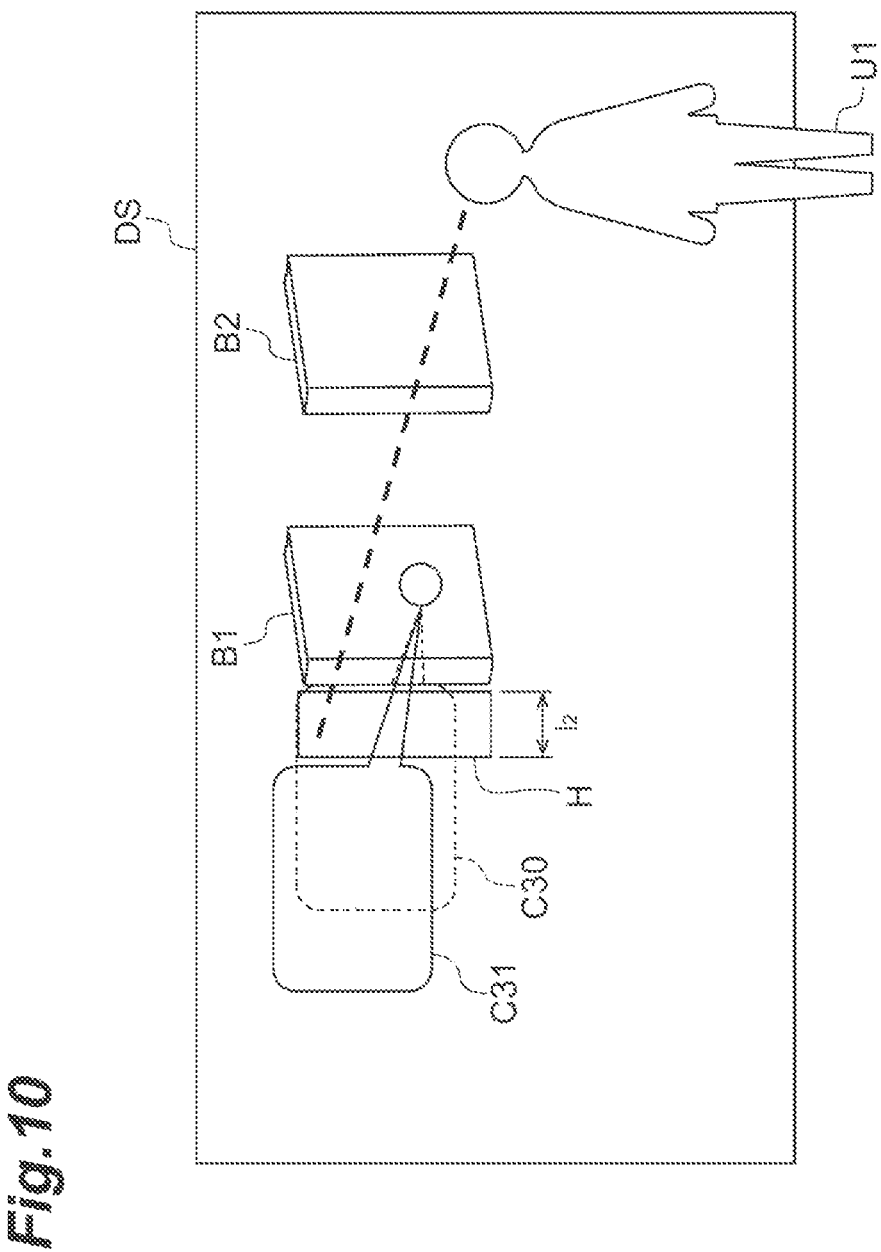
FIG. 10 is a view illustrating a setting process that sets, as a no-display area, an area that is not visible to a user due to the thickness of an object placed on a display screen.

The hidden area H occurs adjacent to the no-display area corresponding to the product B1 on the display screen DS, and in the example of FIG. 10, it occurs on the left of the product B1. The longitudinal length of the hidden area H is substantially equal to the longitudinal length of the product B1. Information about the longitudinal length and the thickness of the product B1 may be previously input by a system administrator or the like, for example, or may be acquired from the e-commerce server 50 or the like that has information of the product B1.

Figure 11:
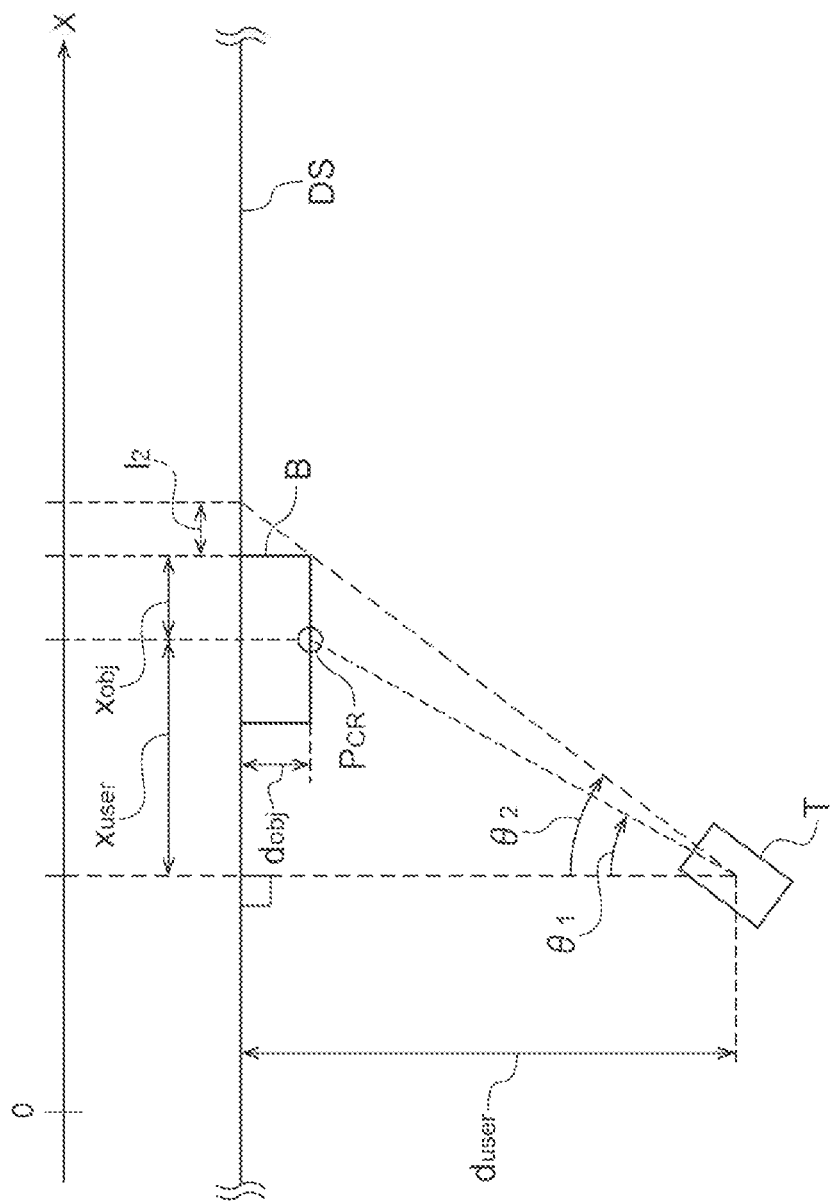
FIG. 11 is a view illustrating an example of calculation of a lateral length of a hidden area.

An example of calculation of a lateral length $l_2$ of a hidden area is described hereinafter with reference to FIG. 11. In the example shown in FIG. 11, a product B is placed on the display screen DS. The product B has a thickness $d_{obj}$. Further, the direction of a cursor position PCR viewed from the terminal T with respect to the direction perpendicular to the display screen DS is at an angle $\theta_1$, and the direction of the right edge of the hidden area H viewed from the terminal T with respect to the direction perpendicular to the display screen DS is at an angle $\theta_2$. The lateral length $l_2$ of the hidden area is represented by the following equation (7).

$$l_2 = d_{obj} \cdot \tan \theta_2 \tag{7}$$

Further, the length from the x-coordinate of the position of the terminal T to the x-coordinate of the cursor position PCR that specifies the product B is $x_{user}$, and the length from the cursor position PCR to the right edge of the product B is $x_{obj}$. When the distance from the terminal T to the display screen DS is $d_{user}$, an angle $\theta_2$ is represented by the following equation (8).

$$\theta_2 \approx \tan^{-1}((x_{user} + x_{obj})/d_{user}) \tag{8}$$

Accordingly, from the equations (7) ad (8), the lateral length $l_2$ of the hidden area is calculated by the following equation (9).

$$l_2 = d_{obj} \cdot \tan(\tan^{-1}((x_{user} + x_{obj})/d_{user})) \tag{9}$$

Note that the value of $d_{user}$ can be estimated based on the size of a character on the display screen DS that is imaged by the terminal T, for example. Further, the value of $x_{user}$ can be obtained by calculating the value of $d_{user}\cdot\tan\theta_1$, for example.

When the distance from the terminal T to the display screen DS is sufficiently longer than the length $x_{obj}$ and the length $l_2$, the angle $\theta_1$ is substantially equal to the angle $\theta_2$. Further, for the angle $\theta_1$, the value of the angle $\theta_{cursor}$ that indicates the orientation of the terminal T can be applied. Thus, from the equation (7), the length $l_2$ is represented as the following equation (10).

$$l_2 = d_{obj}\cdot\tan\theta_1 = d_{obj}\cdot\tan\theta_{cursor} \qquad (10)$$

Referring back to FIG. 10, the setting unit 14 sets the hidden area H by using the lateral length $l_2$ of the hidden area H calculated in the above way, and further sets the set hidden area H as the no-display area. In FIG. 10, content-related information C30 is shown that is displayed in the case where the hidden area H is not included in the no-display area. The display control unit 15 adjusts the display position calculated by the calculation unit 13 so as to display the content-related information in an area other than the no-display area. For example, the display control unit 15 shifts the display position of the content-related information C30 to a position where the content-related information does not overlap the no-display area, as shown in content-related information C31.

As described above, control is made to display the content-related information in an area of the display screen other than the area that is not visible to a user due to the thickness of an object placed on the display screen, and therefore the visibility of the content-related information is improved.

Note that, when displaying a plurality of pieces of content-related information, the display control unit 15 may adjust the display position of the content-related information so that the content-related information do not overlap with each other on the display screen DS. As a result of adjusting the display position in this manner, in no case one content-related information is superimposed on another content-related information, and the visibility of each content-related information is improved.

Figure 12:
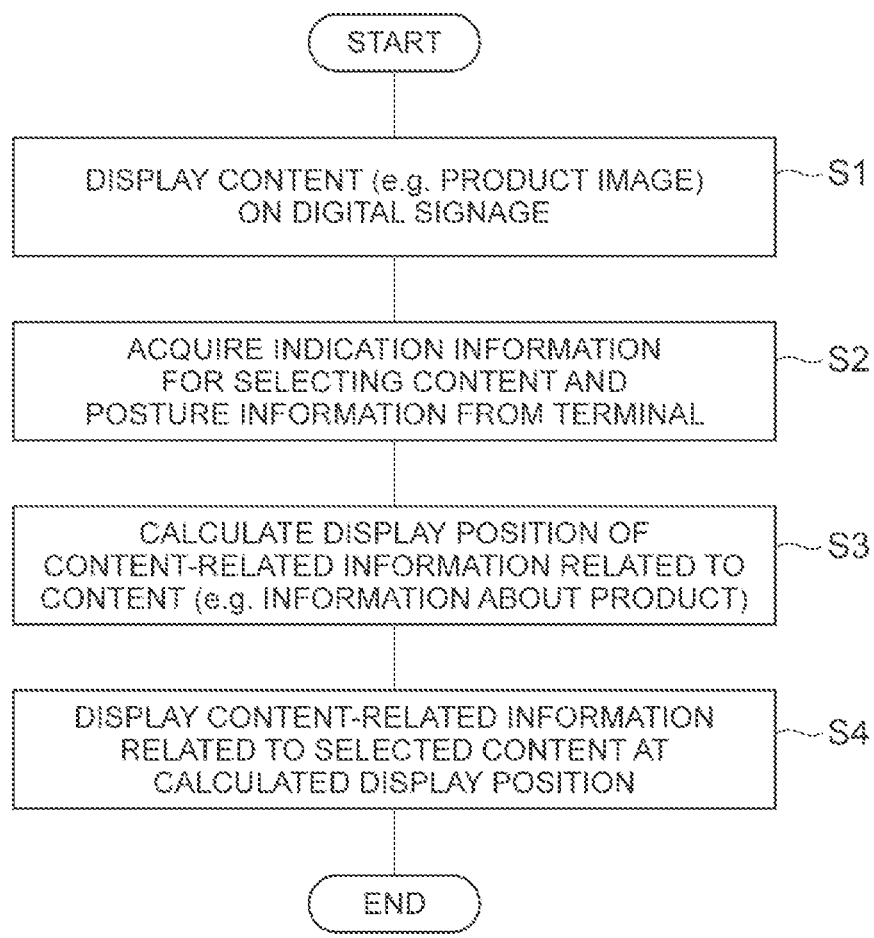
FIG. 12 is a flowchart showing an example of a process of a display control method.

A display control method according to this embodiment is described hereinafter with reference to FIG. 12. FIG. 12 is a flowchart showing an example of a process of a display control method in the display control system 1.

First, the display control unit 15 displays content such as a list of product images, for example, on the display screen DS (digital signage) of the display device D (S1). Next, when a cursor displayed on the display screen DS is operated by a user's operation on the terminal T and the content (product image) is selected by the cursor, the indication information acquisition unit 12 acquires indication information that selects the content from the terminal T (S2). Further, the acquisition unit 11 acquires the posture information indicating the orientation and the tilt of the terminal T from the terminal T.

Then, the calculation unit 13 calculates a display position of content-related information related to the selected content (for example, information related to the selected product image) (S3). After that, the display control unit 15 displays the content-related information related to the selected content at the display position calculated in Step S3 (S4).

Figure 13:
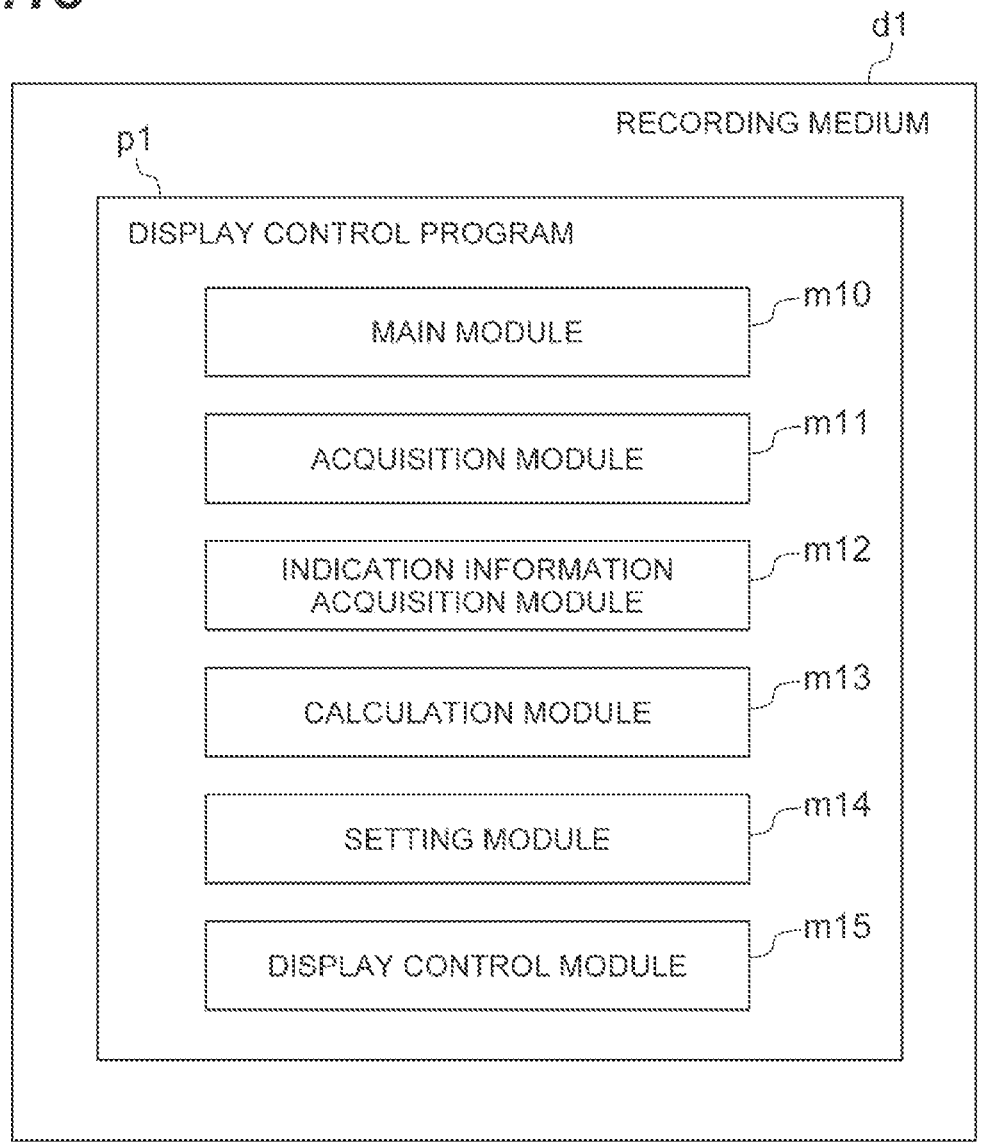
FIG. 13 is a view showing the structure of a display control program.

A display control program that causes a computer to function as the display control system 10 is described hereinafter with reference to FIG. 13. A display control program p1 includes a main module m10, an acquisition module m11, an indication information acquisition module m12, a calculation module m13, a setting module m14, and a display control module m15.

The main module m10 is a part that exercises control over the display control process. The functions implemented by executing the acquisition module m11, the indication information acquisition module m12, the calculation module m13, the setting module m14 and the display control module m15 are respectively equal to the functions of the acquisition unit 11, the indication information acquisition unit 12, the calculation unit 13, the setting unit 14 and the display control unit 15 of the display control system 10 shown in FIG. 2.

The display control program p1 is provided by a storage medium d1 such as CD-ROM, DVD-ROM or semiconductor memory, for example. Further, the display control program p1 may be provided as a computer data signal superimposed onto a carrier wave through a communication network.

According to the display control system 1, the display control method and the display control program p1 according to the embodiment described above, an appropriate display position of content-related information is calculated based on the orientation and the tilt of the terminal T that is operated by a user and the orientation of the display screen DS. Because the display position is a position that is offset from a specified reference position, it is possible to display the content-related information at a position that is easily visible to the user.

An embodiment of the present invention is described in detail above. However, the present invention is not limited to the above-described embodiment. Various changes and modifications may be made to the present invention without departing from the scope of the invention.

Although the indication information acquisition unit 12 and the setting unit 14 are included in the display control system 10 in the embodiment described above, those functional units are not essential elements in this embodiment.

REFERENCE SIGNS LIST

1 . . . display control system, 10 . . . display control device, 11 . . . acquisition unit, 12 . . . indication information acquisition unit, 13 . . . calculation unit, 14 . . . setting unit, 15 . . . display control unit, 17 . . . setting information storage unit, 31 . . . indication input receiving unit, 32 . . . posture information acquisition unit, 33 . . . transmitting unit, 34 . . . display control unit, 50 . . . e-commerce server, D . . . display device, d1 . . . storage medium, DS . . . display screen, H . . . hidden area, m10 . . . main module, m11 . . . acquisition module, m12 . . . indication information acquisition module, m13 . . . calculation module, m14 . . . setting module, m15 . . . display control module, N . . . network, p1 . . . display control program, T . . . terminal

The invention claimed is:

1. A display control system for displaying content on a display screen visible to a user, the display screen being located separately from a terminal operated by the user, comprising:
 at least one memory configured to store computer programming code; and
 at least one processor configured to access said computer programming code and operate as instructed by said computer programming code, said computer programming code comprising:

acquisition code configured to cause at least one of said at least one processor to acquire posture information including an orientation and a tilt of the terminal operated by the user;

calculation code configured to cause at least one of said at least one processor to calculate a display position of content-related information related to the content based on the posture information and an orientation of the display screen; and display control code configured to cause at least one of said at least one processor to display the content-related information on the display screen at the calculated display position, wherein the calculated display position includes an offset from a reference position based on the posture information and the orientation of the display screen, the offset comprising an X-coordinate value and a Y-coordinate value, and wherein the X-coordinate value of the offset has a positive value that increases in response to an angle indicating the orientation of the terminal with respect to the orientation of the display screen increasing in a range from 0° to 90°, and has a negative value, an absolute value of which decreases in response to the angle indicating the orientation of the terminal with respect to the orientation of the display screen increasing in a range from 270° to 360°.

2. The display control system according to claim 1, wherein
the calculated display position is a position that is closer to a position of the terminal than the reference position is.

3. The display control system according to claim 2, wherein
the calculation code is further configured to cause at least one of said at least one processor to obtain the offset without using position information of the terminal.

4. The display control system according to claim 1, wherein the computer programming code further comprises:
setting code configured to cause at least one of said at least one processor to set a no-display area where the content-related information is not to be displayed, wherein
the display control code configured to cause at least one of said at least one processor to adjust the calculated display position so as to display the content-related information in an area other than the no-display area.

5. The display control system according to claim 4, wherein
the setting code is configured to cause at least one of said at least one processor to set, as the no-display area, an object area in the display screen that corresponds to an object placed on the display screen.

6. The display control system according to claim 5, wherein
the setting code is configured to cause at least one of said at least one processor to further set, as the no-display area, in addition to the object area, an area in the display screen that is not visible from a position of the terminal due to a thickness of the object perpendicular to the display screen.

7. The display control system according to claim 1, wherein
the content-related information comprises two or more pieces of content-related information, and the display control code is configured to cause at least one of said at least one processor to adjust display positions of the two or more pieces of the content-related information so that any piece of the content-related information among the two or more pieces of the content-related information does not overlap with another piece of the content-related information on the display screen.

8. The display control system according to claim 1, wherein
the calculation code is configured to cause at least one of said at least one processor to calculate the orientation of the display screen based on posture information acquired from a plurality of terminals, and calculate a relative orientation of the terminal with respect to the display screen based on the calculated orientation of the display screen.

9. A display control method in a display control system comprising at least one computer processor, for displaying content on a display screen visible to a user, the display screen being located separately from a terminal operated by the user, comprising:

acquiring posture information including an orientation and a tilt of the terminal operated by the user;

calculating a display position of content-related information related to the content based on the posture information and an orientation of the display screen; and displaying the content-related information at the calculated display position, on the display screen, wherein the calculated display position includes an offset from a reference position based on the posture information and the orientation of the display screen, the offset comprising an X-coordinate value and a Y-coordinate value, and wherein the X-coordinate value of the offset has a positive value that increases in response to an angle indicating the orientation of the terminal with respect to the orientation of the display screen increasing in a range from 0° to 90°, and has a negative value, an absolute value of which decreases in response to the angle indicating the orientation of the terminal with respect to the orientation of the display screen increasing in a range from 270° to 360°.

10. A non-transitory computer-readable recording medium storing a display control program causing a computer to function as a display control system for displaying content on a display screen visible to a user, the display screen being located separately from a terminal operated by the user, the display control program causing the computer to:

acquire posture information including an orientation and a tilt of the terminal operated by the user;

calculate a display position of content-related information related to the content based on the posture information and an orientation of the display screen; and display the content-related information on the display screen at the calculated display position, wherein the calculated display position includes an offset from a reference position based on the posture information and the orientation of the display screen, the offset comprising an X-coordinate value and a Y-coordinate value, and wherein the X-coordinate value of the offset has a positive value that increases in response to an angle indicating the orientation of the terminal with respect to the orientation of the display screen increasing in a range from 0° to 90°, and has a negative value, an absolute value of which decreases in response to the angle indicating the orientation of the terminal with respect to the orientation of the display screen increasing in a range from 270° to 360°.

11. The display control system according to claim 1, wherein the Y-coordinate value of the offset is obtained by a function of an angle indicating the tilt of the terminal.

12. The display control system according to claim 1, wherein the computer programming code further comprises:
indication information acquisition code configured to cause at least one of said at least one processor to acquire indication information for indicating a position on the display screen from the terminal, wherein
the calculation code is further configured to cause at least one of said at least one processor to calculate a second display position of the content-related information corresponding to a content area selected based on the indication information from one or more content areas previously placed on the display screen, and
the display control code is configured to cause at least one of said at least one processor to display the content-related information corresponding to the content area selected based on the indication information at the calculated second display position.

13. The display control system according to claim 12, wherein
the reference position is specified by the indication information.

14. The display control system according to claim 13, wherein
the reference position is a position of a cursor controlled by the indication information or a position in the content area indicated by the cursor.

* * * * *